Dec. 2, 1952     A. SNIJDERS     2,620,400
ARRANGEMENT FOR COMPARING VOLTAGES
Filed Oct. 11, 1950
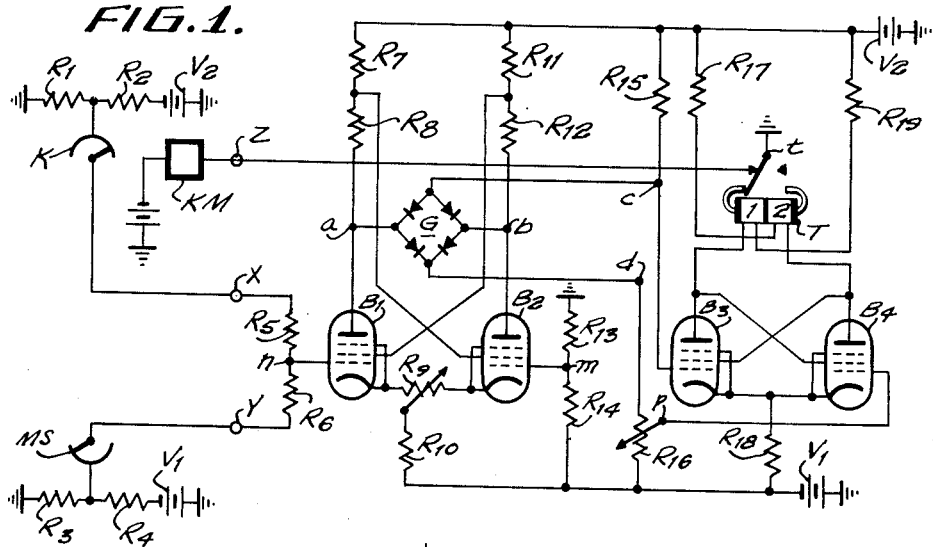
FIG.1.
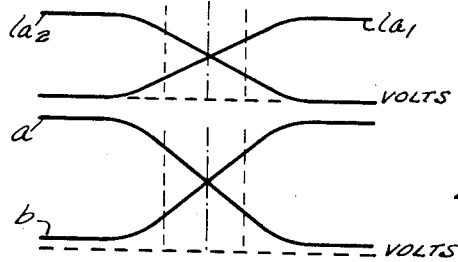
FIG.2.
FIG.3.
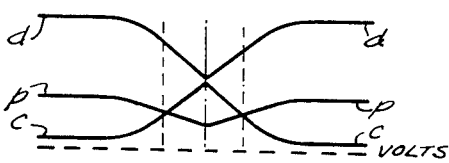
FIG.4
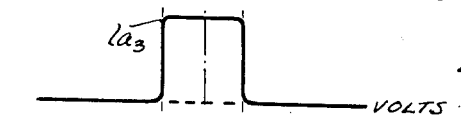
FIG.5.
FIG.6.
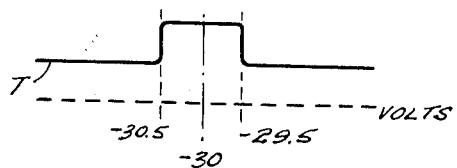
FIG.7.
INVENTOR.
ANTONIE SNIJDERS
BY Patented Dec. 2, 1952

2,620,400

UNITED STATES PATENT OFFICE 2,620,400

ARRANGEMENT FOR COMPARING VOLTAGES

Antonie Snijders, The Hague, Netherlands

Application October 11, 1950, Serial No. 189,532
In the Netherlands October 17, 1949

8 Claims. (Cl. 179—18)

The invention relates to automatic signalling systems for the control of selectors, finders and like apparatus, by a comparison of D. C. voltages, and more particularly to a voltage testing arrangement for use in such systems, extending a stop signal to the apparatus to be positioned, when two D. C. voltages come into a predetermined relation.

An automatic signalling system, particularly telephone system, is described in U. S. patent application Serial No. 767,531, filed July 30, 1947, many elements of which are incorporated in the system according to the present invention. The main feature of the patent application Serial No. 767,531 filed July 30, 1947 consists in that the control of the selecting apparatus to be positioned is effected by comparing in a register two potentials, obtained, respectively, from a marking switch and the control wiper of a selector, finder or the like, and by sending a stop signal to the driving apparatus of the selector or finder, when the two potentials reach substantially the same value. The marking switch is previously positioned under the control of selective signals transmitted by a calling station, and offers in each of the positions thereof a first input potential of a predetermined value to a voltage testing arrangement in the register, which is termed a zero-switch hereinafter. This first input potential varies in an embodiment between ground potential and —60 volts, while, for instance, potentials occurring in consecutive positions form an arithmetical progression having a difference of 2 volts between any consecutive terms thereof. Selectors, finders, and other apparatus to be positioned in accordance with the position of a marking switch, are provided each with a separate control wiper moving along an arch of contacts, which have, consecutively, access to potential sources having values equal to those of corresponding positions of the marking switch. The operation of the system is substantially such, that the selector or finder is clutched to the driving means, after the marking switch has been positioned, and hunts for the wanted outlet and that the circuit for a clutch magnet is interrupted by the armature of a test relay in the zero switch, when the control wiper potential differs by less than ±1 volt from the potential of the marking switch. This holds for the case that the interval between two consecutive marking voltages is 2 volts. The operation of such a zero switch may be compared with that of the galvanometer in the galvanometer branch of a D. C. Wheatstone bridge arrangement, equilibrium being indicated by the operation of the zero switch.

The method of positioning selectors in the manner shortly described hereinbefore may therefore be spoken of as the bridge marking method.

In the development of zero switches for use in systems operating according to the bridge marking method, some difficulties arose which are mainly due to the fact that the zero switch should operate, when equality of the two input potentials occurs, without reference to the absolute value of these potentials, which may vary for instance between ground potential and —60 volts. At the same time it is highly desirable that the discrimination limits, between which equality of input potentials is indicated by the zero switch, are constant for all possible input values. Known devices of this kind have failed in solving these technical problems in a sufficiently economical manner.

It is therefore the main object of the present invention to provide a new method for the positioning of selectors, finders and the like, in which the above difficulties are avoided.

According to one feature of the invention the stop signal is applied to the driving means of a selector, not when equality of two input potentials of the voltage testing arrangement occurs, but when the sum of these two potentials amounts to a predetermined value.

According to another feature of the invention the voltage testing arrangement operates when the input potential reaches a predetermined value, which is independent of the absolute value of marking and control wiper potential.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a wiring diagram of an embodiment of a system including the voltage testing arrangement according to the invention;

Figs. 2–7, inclusive, show currents and voltages occurring in the voltage testing arrangement according to Fig. 1, plotted against the control grid potential of the tube B1 shown in Fig. 1.

Referring now to the drawings and first to Fig. 1, the system comprises a marking switch MS, the wiper of which is positioned according to selective signals in a way not shown in the drawing. In each position of the wiper a potential taken from a potentiometer such as that formed by resistors $R_3$, $R_4$, is connected to a first input terminal $y$.

The potentiometers, such as $R_3$, $R_4$, are connected between ground and the negative terminal of a battery $V_1$, having a potential of —60 volts. On the other hand potentials taken from potentiometers such as $R_1$, $R_2$, also connected between ground and the negative terminal of battery $V_1$, are connected to a second input terminal $x$ via one of the contacts in the control arch $k$ and the control wiper of a selector to be positioned. A clutch magnet K couples the selector to the driving means in a way not shown, and is energized in a circuit over the contact $t$ controlled by a polar relay T.

The terminals $x$ and $y$ are connected to each other by means of two series resistors $R_5$ and $R_6$, which have both a value of about 1 megohm in order to obtain a sufficiently high input resistance. The junction $n$ of $R_5$ and $R_6$ is connected to the control grid of a first high vacuum input tube $B_1$, which is preferably a pentode as are the other tubes mentioned hereinafter.

If it is assumed that in corresponding positions of the marking switch and the selector the sum of the input potentials amounts to —60 volts, then the central tap $n$ of resistors $R_5$ and $R_6$ has a potential of —30 volts, whenever the selector reaches the correct position thereof.

The control grid of a second input tube $B_2$ is connected to the middle tap $m$ of a potentiometer $R_{13}$, $R_{14}$, which is connected between ground and the negative terminal of battery $V_1$. The control grid of tube $B_2$ therefore has a constant potential of —30 volts.

The screen grids of $B_1$ and $B_2$ are connected, respectively, to the junction of the anode resistors $R_{11}$, $R_{12}$ of tube $B_2$ and the anode resistors $R_7$, $R_8$ of tube $B_1$. The resistors are so dimensioned as to cause the tubes $B_1$ and $B_2$ to change the conductivity thereof for input potentials at tap $n$ amounting to, respectively, —31 and —29 volts. When the input potential increases gradually from the first to the second value, the tube $B_1$ gradually increases its anode current from a low value to its maximum. Thus the screen grid voltage of tube $B_2$ gradually becomes sufficiently low to cause the tube $B_2$ to become non-conductive at —29 volts. The variable potentiometer $R_9$ is provided in order to render the discrimination limits symmetrical, if tubes $B_1$ and $B_2$ should have slightly different characteristics, respectively.

A Graetz combination G of rectifier cells is connected on the one hand to the anodes of the input tubes $B_1$ and $B_2$ and on the other hand to the control grids of a second pair of tubes $B_3$ and $B_4$, in the anode circuits of which two windings, respectively, of a polar test relay T are provided. Anode currents of the tubes $B_3$ and $B_4$ produce magnetic fluxes in the windings of the test relay, which are opposite in direction.

The screen grid of tube $B_3$ is coupled to the anode of tube $B_4$, and vice versa, and consequently the tubes $B_3$, $B_4$ form a flip-flop circuit. There are only two stable conditions for such a circuit, one of the two tubes carrying current at any time, and the other being cut off.

The operation of this arrangement is as follows, reference being made to the Figs. 2-7:

When the selector $k$ is to be positioned in accordance with the caller's wishes as recorded in the position of the marking switch MS, the circuit for the clutch magnet K is completed by the register in a way not shown and the selector is started. The control wiper of the selector searches for the outlet having a potential which is the complement of the potential of the marking switch. The potential of tap $n$ in general passes through a number of discrete values, unequal to —30 volts, and finally reaches a value between —30.5 and —29.5 volts, ± 0.5 volt being the discrimination limit of the voltages testing arrangement in the present example. This value of the input potential is an indication of the fact, that the selector has found the wanted outlet.

Referring now to Fig. 2 it may be seen, that the anode current $Ia_1$ of the tube $B_1$ for all input potentials lower than —31 volts may be neglected, whereas for potentials higher than —29 volts this current practically has its maximum value. On the contrary, the tube $B_2$ is fully conductive below —31 volts, and carries no current when the input potential exceeds —29 volts. In the discrimination interval both tubes carry current. By means of the variable potentiometer $R_9$ the tubes are so balanced as to carry currents at —30 volts having the same value.

The anode potentials of the tubes $B_1$ and $B_2$ being the potentials of points $a$ and $b$, are shown in Fig. 3, whereas Fig. 4 shows the potentials of the two points $c$ and $d$ of the rectifier cell arrangement G. The arrangement is such, that the potential of point $c$ is always nearly equal to the lower one of the two anode potentials, whereas that of point $d$ is equal to the higher one of the two anode potentials. This is clear when it is considered that both the upper cells form a very high resistance for potentials positive with respect to point $c$, but potentials negative with respect to point $c$ may assert themselves at point $c$ without impedance. The same holds in the reverse direction for the higher potentials with respect to point $d$.

Consequently the control grid potential of tube $B_3$, starting from a low value, increases for input potentials up to —30 volts, and decreases afterwards. On the contrary the control grid of the tube $B_4$ via the potentiometer $R_{16}$ attains a potential, starting from a value $p$, higher than that of point $c$, decreasing at first until —30 volts is reached by the input potential, and increasing thereafter until the initial value is attained again.

It should be noted that by means of the potentiometer $R_{16}$ a control grid potential is obtained, which is proportional to the potential of point $d$, and that the discriminating limits are dependent on the position of this potentiometer. That is to say, the position in which both tubes of the flip-flop circuit have the same control grid potential, is not a stable position. Consequently for each input potential between the discrimination limits the tube $B_4$ closes immediately, and due to the higher screen grid voltage caused thereby, the tube $B_3$ opens (Figs. 5 and 6).

When the tubes $B_3$ and $B_4$ change in conductivity, the magnetization of test relay T is reversed (Fig. 7) so that the armature $t$ opens the circuit of the clutch magnet K and the selector stops at the wanted outlet.

In an alternative embodiment, the resistor $R_{15}$ and the potentiometer $R_{16}$ could be interchanged. The control grid of the tube $B_3$ is in this embodiment connected to the tap of the potentiometer substituted for the resistor $R_{15}$.

The two input tubes with cell rectifiers at the anode side thereof may be replaced by a cell combination connected directly to the connecting point of the resistances $R_5$ and $R_6$, the standard voltage and the grids of the flip-flop, in which case a small battery must be connected in series with one of the grids for fixing the tolerance limits.

While I have illustrated and described the invention as embodied in arrangements for comparing potentials, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. An arrangement for comparing potentials comprising in combination, a first input terminal; means for applying a fixed potential to said first input terminal; a second input terminal; means for applying to said second input terminal a progression of consecutive potentials one after the other; two resistors connected in series between said input terminals so as to apply to the series connection of said resistors the sum of said fixed potential and that one of said consecutive potentials which has been applied to said second input terminal, said resistors having a junction connecting the same and attaining varying potentials when said fixed potential and said consecutive potentials are applied, respectively, to said first and second input terminals; a pair of input tubes each having a control grid, a screen grid, and an anode, said control grid of the one of said input tubes being connected to said junction of said two series-connected resistors; a constant potential source connected to the control grid of the other of said input tubes, said screen grid of one of said input tubes being connected to said anode of the other of said input tubes and vice versa; and a flip-flop circuit connected to said anodes of said input tubes and changing the operative condition thereof whenever said junction of said two resistors attains a potential differing from a predetermined value by predetermined limits.

2. An arrangement for comparing potentials comprising in combination, a first input terminal; means for applying a fixed potential to said first input terminal; a second input terminal; means for applying to said second input terminal a progression of consecutive potentials one after the other; two resistors connected in series between said input terminals so as to apply to the series connection of said resistors the sum of said fixed potential and that one of said consecutive potentials which has been applied to said second input terminal, said resistors having a junction connecting the same and attaining varying potentials when said fixed potential and said consecutive potentials are applied, respectively, to said first and second input terminals; a pair of input tubes each having a control grid, a screen grid, and an anode, said control grid of one of said input tubes being connected to said junction of said two series-connected resistors; a constant potential source connected to the control grid of the other of said input tubes, said screen grid of one of said input tubes being connected to said anode of the other of said input tubes and vice versa; a combination of rectifier cells connected with the input thereof to the anodes of said input tubes; and a flip-flop circuit connected to the output of said rectifier cells and changing the operative condition thereof whenever said junction of said two resistors attains a potential differing from a predetermined value by predetermined limits.

3. An arrangement for comparing potentials comprising in combination, a first input terminal; means for applying a fixed potential to said first input terminal; a second input terminal; means for applying to said second input terminal a progression of consecutive potentials one after the other; two resistors connected in series between said input terminals so as to apply to the series connection of said resistors the sum of said fixed potential and that one of said consecutive potentials which has been applied to said second input terminal, said resistors having a junction connecting the same and attaining varying potentials when said fixed potential and said consecutive potentials are applied, respectively, to said first and second input terminals; a pair of input tubes each having a control grid, a screen grid, and an anode, said control grid of one of said input tubes being connected to said junction of said two series-connected resistors; a constant potential source connected to the control grid of the other of said input tubes, said screen grid of one of said input tubes being connected to said anode of the other of said input tubes and vice versa; a combination of rectifier cells having two input terminals connected to the anodes of said input tubes, respectively, and two output terminals, one of said output terminals having a potential being substantially equal to the lower one of the potentials applied to said input terminals of said combination of rectifier cells, the other of said output terminals having a potential being substantially equal to the higher one of the potentials applied to said input terminals of said combination of rectifier cells; and a flip-flop circuit connected to said output terminals of said combination of rectifier cells and changing the operative condition thereof whenever said junction of said two resistors attains a potential differing from a predetermined value by predetermined limits.

4. An arrangement for comparing potentials comprising in combination, a first input terminal; means for applying a fixed potential to said first input terminal; a second input terminal; means for applying to said second input terminal a progression of consecutive potentials one after the other; two resistors connected in series between said input terminals so as to apply to the series connection of said resistors the sum of said fixed potential and that one of said consecutive potentials which has been applied to said second input terminal, said resistors having a junction connecting the same and attaining varying potentials when said fixed potential and said consecutive potentials are applied, respectively, to said first and second input terminals; means connected to said junction of said two series-connected resistors, and including a flip-flop circuit changing the operative condition thereof whenever said junction of said two resistors attains a potential differing from a predetermined value by predetermined limits; a relay having two windings operating in opposition to each other; said windings being associated with said flip-flop circuit so as to energize said windings one at a time and to reverse the magnetization of said relay with any change over from one of said windings to the other; and a contact controlled by said relay and controlling said means for applying to said second input terminal a progression of consecutive potentials.

5. An arrangement for comparing potentials comprising in combination, a first input terminal; means for applying a fixed potential to said first input terminal; a second input terminal; means for applying to said second input terminal a progression of consecutive potentials one after the other: two resistors connected in series connection of said resistors the sum of said fixed potential and that one of said consecutive potentials which has been applied to said second input terminal, said resistors having a junction connecting the same and attaining varying potentials when said fixed potential and said consecutive potentials are applied, respectively, to said first and second input terminals; a pair of input tubes each having a control grid, a screen grid, and an anode, said control grid of one of said input tubes being connected to said junction of said two series-connected resistors; a constant potential source connected to the control grid of the other of said input tubes, said screen grid of one of said input tubes being connected to said anode of the other of said input tubes and vice versa; a combination of rectifier cells having two input terminals connected to the anodes of said input tubes, respectively, and two output terminals, one of said output terminals having a potential being substantially equal to the lower one of the potentials applied to said input terminals of said combination of rectifier cells, the other of said output terminals having a potential being substantially equal to the higher one of the potentials applied to said input terminals of said combination of rectifier cells; a flip-flop circuit connected to said output terminals of said combination of rectifier cells and changing the operative condition thereof whenever said junction of said two resistors attains a potential differing from a predetermined value by predetermined limits; a relay having two windings operating in opposition to each other; said windings being associated with said flip-flop circuit so as to energize said windings one at a time and to reverse the magnetization of said relay with any change over from one of said windings to the other; and a contact controlled by said relay and controlling said means for applying to said second input terminal a progression of consecutive potentials.

6. An arrangement for comparing potentials comprising in combination, a first input terminal; means for applying a fixed potential to said first input terminal; a second input terminal; means for applying to said second input terminal a progression of consecutive potentials one after the other; two resistors connected in series between said input terminals so as to apply to the series connection of said resistors the sum of said fixed potential and that one of said consecutive potentials which has been applied to said second input terminal, said resistors having a junction connecting the same and attaining varying potentials when said fixed potential and said consecutive potentials are applied, respectively, to said first and second input terminals; a pair of input tubes each having a control grid, a screen grid, and an anode, said control grid of the other of said input tubes being connected to said junction of said two series-connected resistors; a constant potential source connected to the control grid of the other of said input tubes, said screen grid of one of said input tubes being connected to said anode of the other of said input tubes and vice versa; a flip-flop circuit including two tubes each having a control grid, a screen grid, and an anode, said control grids of said tubes of said flip-flop circuit being connected, respectively, to said anodes of said input tubes, said screen grid of one of said tubes of said flip-flop circuit being connected to said anode of the other of said tubes of said flip-flop circuit and vice versa; and a relay having two windings operating in opposition to each other, said windings being connected in the anode circuits, respectively, of said tubes of said flip-flop circuit, whereby said windings are energized one at a time and reverse the magnetization of said relay whenever the junction of said two resistors attains a potential differing from a predetermined value by predetermined limits.

7. An arrangement for comparing potentials comprising in combination, a first input terminal; means for applying a fixed potential to said first input terminal; a second input terminal; means for applying to said second input terminal a progression of consecutive potentials one after the other; two resistors connected in series between said input terminals so as to apply to the series connection of said resistors the sum of said fixed potential and that one of said consecutive potentials which has been applied to said second input terminal, said resistors having a junction connecting the same and attaining varying potentials when said fixed potential and said consecutive potentials are applied, respectively, to said first and second input terminals; a pair of input tubes each having a control grid, a screen grid, and an anode, said control grid of one of said input tubes being connected to said junction of said two series-connected resistors; a constant potential source connected to the control grid of the other of said input tubes, said screen grid of one of said input tubes being connected to said anode of the other of said input tubes and vice versa; a combination of rectifier cells having two input terminals connected to the anodes of said input tubes, respectively, and two output terminals, one of said output terminals having a potential being substantially equal to the lower one of the potentials applied to said input terminals of said combination of rectifier cells; a flip-flop circuit including two tubes each having a control grid, a screen grid, and an anode, said control grids of said tubes of said flip-flop circuit being connected, respectively, to said anodes of said input tubes, said screen grid of one of said tubes of said flip-flop circuit being connected to said anode of the other of said tubes of said flip-flop circuit and vice versa; and a relay having two windings operating in opposition to each other, said windings being connected in the anode circuits, respectively, of said tubes of said flip-flop circuit, whereby said windings are energized one at a time and reverse the magnetization of said relay whenever the junction of said two resistors attains a potential differing from a predetermined value by predetermined limits.

8. An arrangement for comparing potentials comprising in combination, a first input terminal; means for applying a fixed potential to said first input terminal; a second input terminal; means for applying to said second input terminal a progression of consecutive potentials one after the other; two resistors connected in series between said input terminals so as to apply to the series connection of said resistors the sum of said fixed potential and that one of said consecutive potentials which has been applied to said second input terminal, said resistors having a junction connecting the same and attaining varying potentials when said fixed potential and said consecutive potentials are applied, respectively, to said first and second input terminals; a pair of input tubes each having a control grid, a screen grid, and an anode, said control grid of one of said input tubes being connected to said junction of said two series-connected resistors; a constant potential source connected to the control grid of the other of said input tubes, said screen grid of one of said input tubes being connected to said anode of the other of said input tubes and vice versa; a combination of rectifier cells having two input terminals connected to the anodes of said input tubes, respectively, and two output terminals, one of said output terminals having a potential being substantially equal to the lower one of the potentials applied to said input terminals of said combination of rectifier cells; a flip-flop circuit including two tubes each having a control grid, a screen grid, and an anode, said control grids of said tubes of said flip-flop circuit being connected, respectively, to said anodes of said input tubes, said screen grid of one of said tubes of said flip-flop circuit being connected to said anode of the other of said tubes of said flip-flop circuit and vice versa; a relay having two windings operating in opposition to each other, said windings being connected in the anode circuits, respectively, of said tubes of said flip-flop circuit, whereby said windings are energized one at a time and reverse the magnetization of said relay whenever the junction of said two resistors attains a potential differing from a predetermined value by predetermined limits; and a contact controlled by said relay and controlling said means for applying to said second input terminal a progression of consecutive potentials.

ANTONIE SNIJDERS.

REFERENCES CITED

The following references are of record in the file of this patent:

UNITED STATES PATENTS

| Number | Name | Date |
|---|---|---|
| 2,561,475 | Jacobsen | July 24, 1951 |